Figure 1:
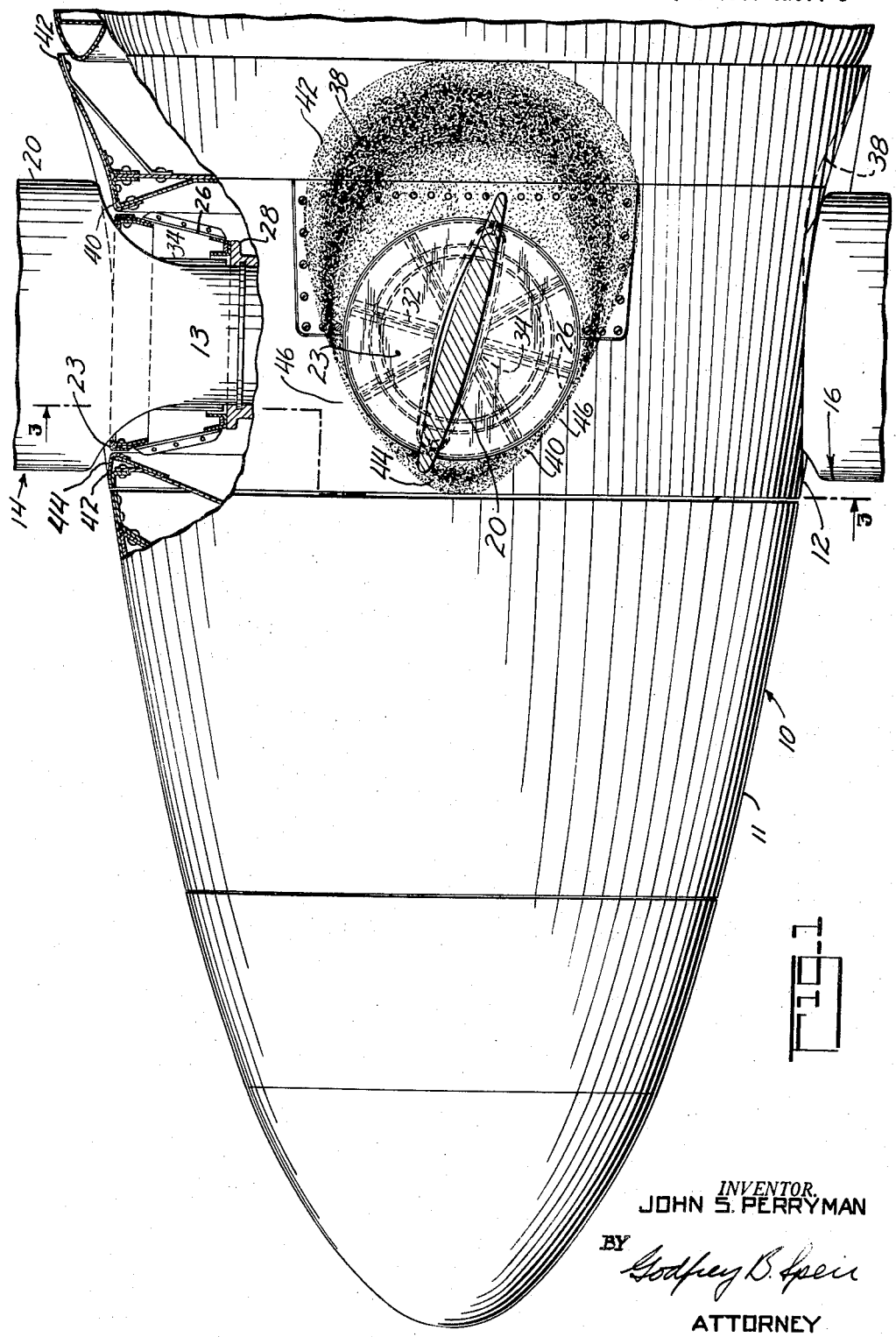

Feb. 9, 1960 — J. S. PERRYMAN — 2,924,282
AIRCRAFT PROPELLER SPINNERS
Filed June 21, 1955 — 3 Sheets-Sheet 1

INVENTOR.
JOHN S. PERRYMAN
BY *Godfrey B. Spear*
ATTORNEY

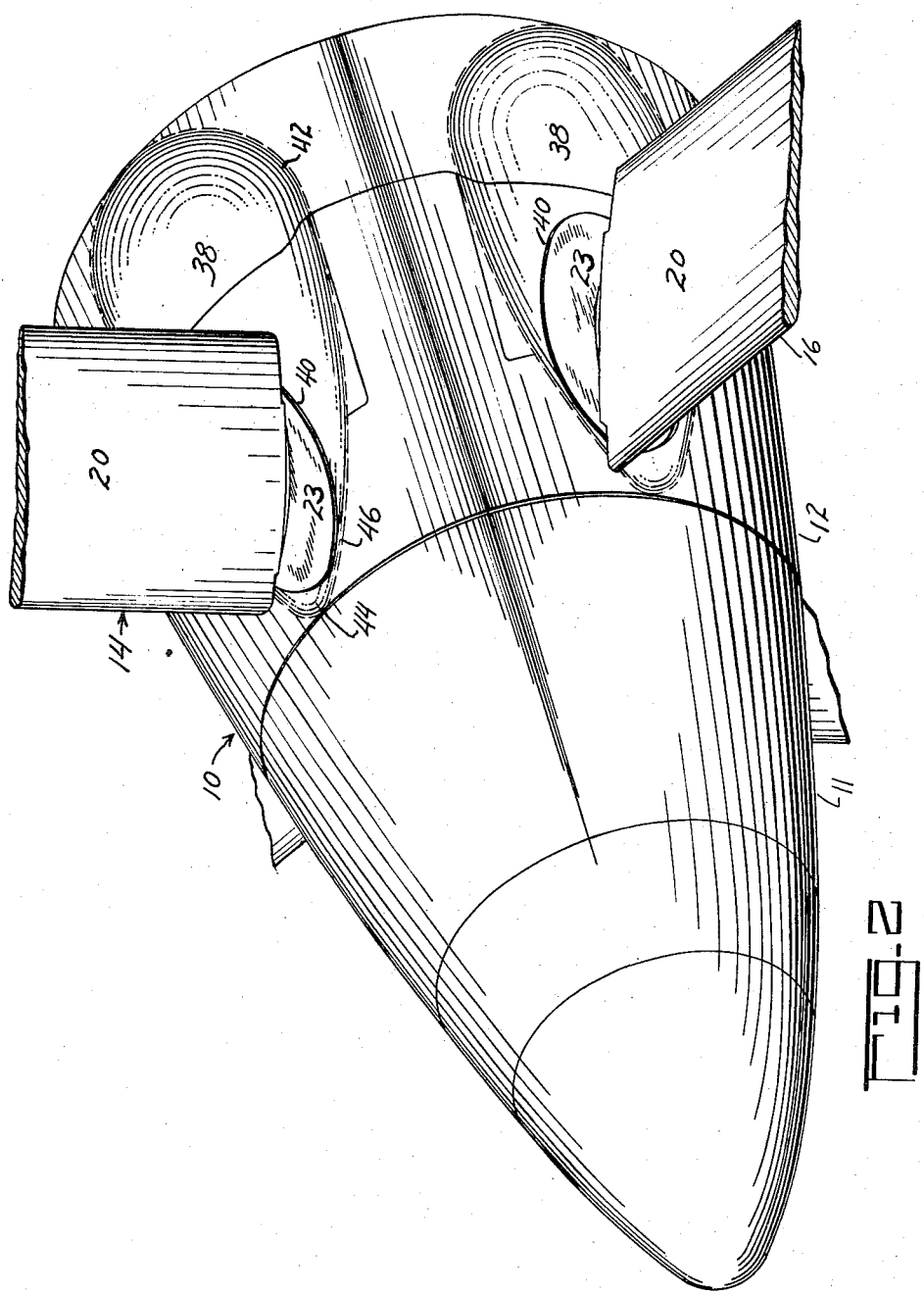

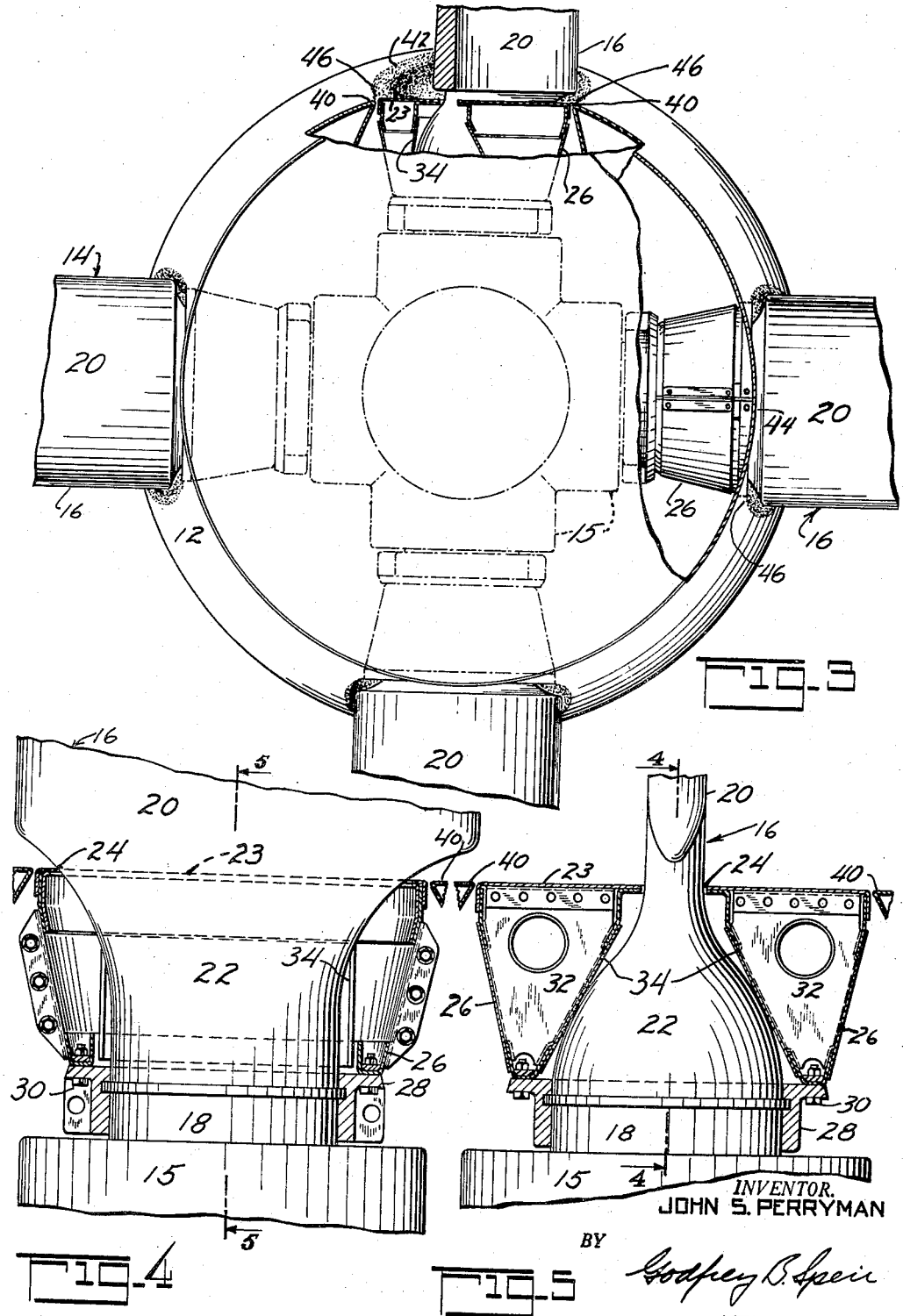

United States Patent Office 2,924,282
Patented Feb. 9, 1960

2,924,282

AIRCRAFT PROPELLER SPINNERS

John S. Perryman, Fayson Lakes, N.J., assignor to Curtiss-Wright Corporation, a corporation of Delaware Application June 21, 1955, Serial No. 516,956

9 Claims. (Cl. 170—160.23)

This invention relates to streamlining spinners for the hubs of aircraft propellers, and provides a drag-reducing spinner along with means to seal the blade of a propeller relative to the spinner surface where the blade projects outwardly through the spinner.

Considerable inventive ingenuity has been exercised in providing blade-spinner seals and fairings, to enable turning of a propeller blade for pitch change and to hold a tight, streamlined seal between the spinner and blade for all blade pitch positions. Some of these provide a fixed pitch streamlined riser on the spinner through which a cylindrical blade shank projects, the blade being cuffed outboard of the riser and the cuff being closely spaced to the outer end of the riser. Such arrangements have the disadvantage that the riser has minimum drag at only one flight condition, whereat the riser pitch corresponds to the blade pitch.

Other prior arrangements provide blade-spinner seals which are flexible and which conform to the spinner curvature for all pitch adjustments of the blade, the seal member or disc turning with the blade when its pitch is changed, but being constrained to spinner curvature by guiding means between the spinner and the seal member. Such arrangements afford effective streamlining but introduce structural and mechanical complications, and are likely to cost considerable added weight.

In the present invention, I use a flat seal disc secured to a propeller blade, whose edge lies adjacent the edge of a hole in the spinner. The hole edge, in a plane normal to the blade axis, lies predominantly within the envelope of spinner curvature, and the hole edge is faired or blended through a depressed spinner surface portion with the main spinner body.

I find that this arrangement under certain flight speed conditions gives less aerodynamic drag than other spinner-blade seal configurations even though, at first glance, it would appear not to do so. Particularly in the region of transonic and low supersonic aircraft speed, a phenomenon exists, sometimes called "area rule" wherein the drag of a system of wing and body juncture, in the region of Mach 1, may be reduced by providing depressed portions in the body adjacent the juncture. At the juncture the drag of the body affects the wing and vice versa. A limited amount of theory has been developed to enable design of the depressed portions on a body for a wing juncture, where design can be predicated on some certain design Mach number.

My invention consists in applying the generalized theory mentioned above to blade-spinner junctures, by utilizing a depression in the spinner surface adjacent the point where the blade projects from the spinner. The invention also consists in adapting the spinner depression to a simple and effective blade-spinner seal, whereby the complexities and inefficiencies of prior art blade-spinner seals are overcome.

Thus far, the "area rule" theory appears to have optimum effect in the speed range of Mach .9 to Mach 1.2; however, in applying it to propellers, it is quite possible that the rule may be applicable with good effect over a wider speed range.

The provisions of the invention are illustrated in the attached drawings and are described in detail in the following text. The embodiment of the invention chosen for illustration is a preferred one for a particular aircraft application, and is exemplary. However, it is not to be considered as limiting the scope of the invention.

In the drawings, wherein similar reference characters indicate similar parts, Fig. 1 is an elevation of a spinner-propeller combination incorporating the invention, part of the figure being broken away to show parts in section, Fig. 2 is a perspective elevation of the invention, Fig. 3 is a frontal section of the invention taken on the line 3—3 of Fig. 1, and Figs. 4 and 5 are enlarged elevations, partly in section, taken on the lines 5—5 and 4—4 of Figs. 5 and 4 respectively, showing blade seals of the invention.

The drawings show a spinner 10 having a forward nose portion 11 which may be non-rotatably mounted according to known techniques, and a rearward portion 12 rotatable with a propeller 14. The propeller, as best seen in Fig. 3, includes four hub sockets 15 having a blade 16 extending radially from each one. As seen in Figs. 4 and 5, each blade includes an inner shank portion 18 secured in a hub socket, an outer relatively flat airfoil portion 20, and a tapered transition portion 22 blending the shank into the airfoil portion for optimum stress transmission. Each blade includes a relatively flat blade seal disc 23 normal to the blade axis and crossing the latter at a point which is a short distance inwardly of the inner end of the blade airfoil portion 20. The disc 23 is preferably made in two halves, the halves including relief cutouts formed to the blade profile, whereby there is minimum gap 24 between blade surface and seal disc cutout edge.

Each disc 23 is firmly and substantially rigidly secured to its propeller blade by any suitable means. The means I prefer comprises a truncated cone 26 disposed between and secured to the disc and a flange 28 secured to the blade shank 18 close to the hub socket 15. The cone 26 is split longitudinally forming two halves which may be assembled around the blade shank, with the halves of the disc 23. The cone inner ends are attached to the flange 28 as by bolts 30, the flange 28, in turn, being in halves which are clamped around the propeller blade shank. To provide further reinforcement of the disc against outward bulging due to centrifugal force acting thereon during propeller rotation, substantially radial bulkheads 32 are secured to the disc 23 and cone 26. Also, bulkheads 34, conformed to the blade cutout in the disc 23 and to the circular form of the inner end of the cone 26, are secured to the disc, the flange 28 and the radial bulkheads 32. These reinforcements provide a strong, light and rigid attachment for the disc 22.

The rotating spinner part 12 includes an outer truncated substantially conical surface throughout most of its periphery. However, at each zone adjacent a propeller blade, the spinner surface is indented or depressed, the depressed spinner area lying within the envelope of the normal spinner profile. These depressions, one for each blade, are shown at 38. Around each blade seal disc 23, the depressed portions 38 are formed as plane circles normal to the blade axis and are provided with circular cutouts, the cowl edges as at 40 adjacent these cutouts lying in closely spaced relation to the edges of discs 23 to form with the discs a smoothly faired surface. The disc, of course, rotates with the propeller blade during pitch change. But since the disc and circular edge 40 are coplanar and normal to the blade axis, there is no discontinuity in the fairing of one to the other as propeller blade pitch is changed.

The depressions 38 are carefully faired in smooth curves from the edge 40 to the perimeters of the depressions as at 42, and the depressions also fair smoothly into the spinner 12 surfaces of revolution. Since the form of the spinner is conic, the depressions 38 are preponderantly rearward of the blade seal discs 23 as shown. However, there are small parts of the depressions in front of the blade discs as at 44. At points 46 (Fig. 3) the depressions disappear and the discs 22 intercept the contour of the spinner 12 except for small fairing curves at this location to avoid abrupt change of form of the surface elements at these points.

The planform of the depression 38 appears more or less egg-shaped as seen in Fig. 1, with the major axis extending longitudinally of the spinner. This axis, and the planform of the depression, may be skewed to an angle corresponding in general to the pitch angle of the inner end of the propeller blade, when the blade is at the pitch angle required for maximum or crusing aircraft speed.

The spinner depression and blade seal arrangements herein described conform to the general theory set forth at the beginning of this specification, and provide a spinner-propeller combination which takes advantage of the aforesaid "area rule" and enables a substantial reduction in drag over prior spinner-blade seal configurations, particularly in the transonic and low supersonic speed ranges.

The relatives sizes and shapes of the several elements and components involved in the invention are subject to appropriate design modification, while still coming within the scope of the invention.

While a single embodiment of the invention has been shown and described, other arrangements of components are intended to be covered hereby, insofar as they may be covered by the following claims.

What is claimed is:

1. In an aircraft powerplant comprising an engine having a controllable pitch propeller mounted thereon, the propeller comprising a hub having blades projecting substantially radially therefrom, a streamlined spinner embracing and secured to said hub, said spinner having depressions in its surface in the region where each blade projects through the spinner, the surface of each depression having a circular opening coaxial with the axis of the associated blade, the edge of each opening lying in a plane normal to the axis of the associated blade, a seal assembly for each blade comprising a substantially flat disc embracing the blade and matching the edge of the associated circular spinner opening, seal assembly being secured to said blade and rotatable therewith as the blade rotates on its own axis for pitch change.

2. In an aircraft powerplant comprising an engine having a controllable pitch propeller mounted thereon, the propeller comprising a hub having blades projecting substantially radially therefrom, a streamlined spinner embracing and secured to said hub, said spinner having depressions in its surface in the region where each blade projects through the spinner, the surface of each depression having a circular opening coaxial with the axis of the associated blade, the edge of each opening lying in a plane normal to the axis of the associated blade, a seal assembly for each blade comprising a substantially flat disc embracing the blade and matching the edge of the associated circular spinner opening, seal assembly being secured to said blade and rotatable therewith as the blade rotates on its own axis for pitch change, said spinner depressions each being smoothly faired into the surrounding streamlined spinner streamlined surfaces.

3. In an aircraft powerplant comprising an engine having a controllable pitch propeller mounted thereon, the propeller comprising a hub having blades projecting substantially radially therefrom, a streamlined spinner embracing and secured to said hub, said spinner having depressions in its surface in the region where each blade projects through the spinner, the surface of each depression having a circular opening coaxial with the axis of the associated blade, the edge of each opening lying in a plane normal to the axis of the associated blade, a seal assembly for each blade comprising a substantially flat disc embracing the blade and matching the edge of the associated circular spinner opening, seal assembly being secured to said blade and rotatable therewith as the blade rotates on its own axis for pitch change, said spinner depressions each being smoothly faired into the surrounding streamlined spinner streamlined surfaces and each said depression comprising an elongated groove extending rearwardly of the associated blade, the groove being slightly skewed relative to the spinner axis substantially in consonance with the blade pitch angle when the blade is at an optimum pitch setting for high speed flight.

4. A drag reducing spinner for an aircraft propeller comprising a body of revolution having an ogival longitudinal profile, said body having depressions in the surface thereof extending circumferentially of the body to a limited extent and longitudinally of the body to a greater extent, said depressions being substantially egg-shaped in planform and having their margins faired smoothly into the main spinner surface, a portion of each depression having a circular planar opening therein toward the forward part thereof, the opening plane being normal to a spinner radius, a propeller blade coaxial with such spinner radius projecting through each such opening, and a disc fairing embracing and secured to each blade and matched at its edge with the edge of the associated opening.

5. A spinner according to claim 4 wherein the major axis of the egg-shaped outline of the spinner depression is skewed relative a longitudinal plane, in substantial consonance with the pitch of the propeller blade associated therewith.

6. A spinner for an aircraft propeller comprising an ogival body of revolution coaxial with the propeller, the surface of the spinner having a depression therein, part of said depression having a circular opening for projection of a propeller blade therethrough, the circular opening edge lying predominantly beneath and within the spinner envelope and lying in a plane normal to a spinner radius, said depression surface having such form that surface elements thereof are faired smoothly from the edge of said opening into the spinner body.

7. A spinner according to claim 6 wherein the planform of the depression where it fairs into the spinner body is substantially egg-shaped, with said circular opening predominantly toward the forward part of the depression.

8. A spinner according to claim 6 wherein portions of the edge of said circular opening forward of the center thereof intersect the spinner body surface.

9. A spinner according to claim 6 including a disc secured to and embracing a propeller blade extending through said opening, said disc being rotatable with the propeller blade when adjusted for pitch change, the edge of said disc lying close to and adjacent the edge of said opening.

References Cited in the file of this patent

UNITED STATES PATENTS

| 2,471,895 | Radtke | May 31, 1949 |
| 2,522,083 | Avondoglio | Sept. 12, 1950 |
| 2,612,227 | Cushman | Sept. 30, 1952 |

OTHER REFERENCES

Aviation Week, September 12, 1955, vol. 63, No. 11, pages 12–15, inclusive.

Flight, November 18, 1955, vol. 68, pages 769–771, inclusive.

NACA Research Memorandum L52H08 dated September 3, 1952, entitled "A Study of Zero-Lift Drag Rise Characteristics of Wing-Body Combinations Near the Speed of Sound."

"Aviation Dictionary and Reference Guide," third edition, 1951, Aero Publishers, Inc., page 129.